W. O. Hickok,
Cider Mill
No. 1,161. Reissued Mar. 26, 1861.
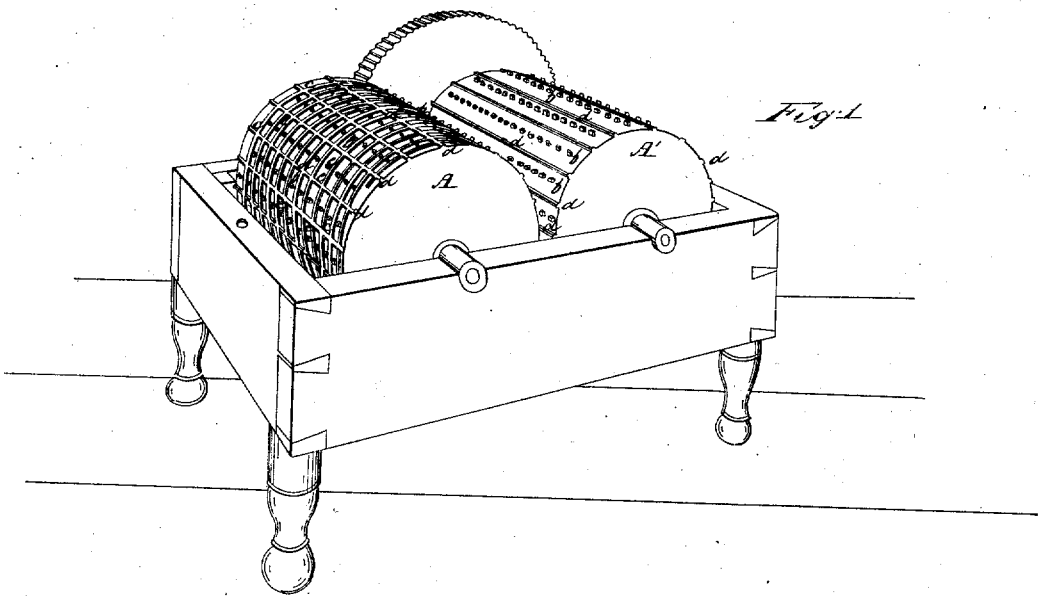
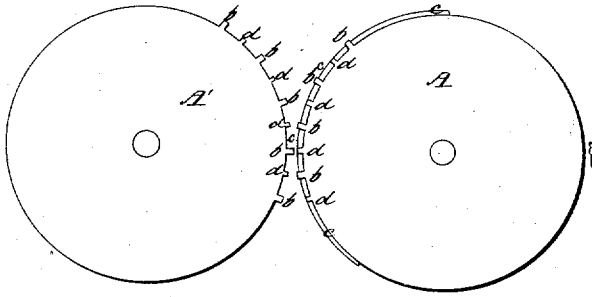
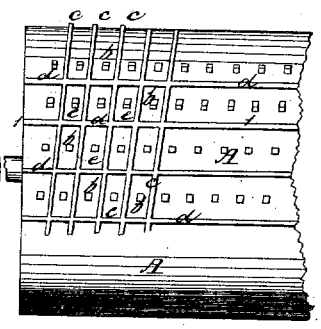
Witnesses.
C. A. Snyder
Hamilton Ricks
Inventor
W O Hickok
AM. PHOTO-LITHO. CO. N.Y. (OSBORNE'S PROCESS)

UNITED STATES PATENT OFFICE.

W. O. HICKOK, OF HARRISBURG, PENNSYLVANIA.

IMPROVEMENT IN MILLS FOR GRINDING APPLES.

Specification forming part of Letters Patent No. 13,839, dated November 20, 1855; Reissue No. 1,161, dated March 26, 1861.

*To all whom it may concern:*

Be it known that I, W. O. HICKOK, of Harrisburg city, in the county of Dauphin and State of Pennsylvania, have invented a new and useful Improvement in Mills for Grinding Apples and other like substances; and I do hereby declare that the following is a full, clear, and exact description of the construction and operation of the same, reference being had to the annexed drawings, making part of this specification, in which—

Figure 1 is a perspective view, showing the improvement applied; Figs. 2 and 3 transverse sections of the cylinder, showing the relative positions of the breakers, helical ribs, and teeth; and Fig. 4, a sectional side view of one of the said cylinders, like letters indicating the same objects when in the different figures.

My improvement is applied in this instance to the machine for grinding apples, &c., improved and patented by Samuel W. Powel, December 4, 1849, the characteristics of which machine are two cylinders or rolls moving with unequal velocities, on whose surfaces helical ribs and parallel longitudinal rows of tearing or cutting teeth are formed, substantially as described in his specification; but during the operation of the said Powel's machine most of the small lumps which are torn or cut from the fruit by the teeth on the cylinders pass from between the said cylinders in solid or uncrushed conditions, and consequently a large proportion of the juice of the fruit is eventually lost, it being found to be almost impossible to express it from these uncrushed lumps by the subsequent operation on the same in the press. Therefore to adapt the machine to crush these lumps while they are passing between the cylinders is the object of my invention.

It consists in the application of what I call "breakers" to the cylinders of such mills for grinding apples, &c., so that all the small lumps which are torn or cut from the broken fruit by the teeth of the said cylinder (whether in combination with the said spiral ribs or not) in grinding shall be completely crushed by the said breakers of one cylinder operating in combination with the said teeth of the other cylinder, substantially as hereinafter described.

In the drawings, A A′ are the cylinders; *b b*, the teeth; *c c*, the helical ribs, and *d d* the breakers.

The breakers *d d* consist of slight projections arranged along between the parallel rows of the teeth *b b*, and may be formed as continuous longitudinal ridges, either serrated or plain, as seen in the drawings, or as series of short distinct teeth, but in either case of only one-half (more or less) of the radial length of the tearing-teeth *b b*, as is more distinctly shown in Figs. 2 and 3.

The teeth *b b* are usually formed in the shape of rectangular prisms, as seen in the drawings; but they may be of a pyramidal form, if preferred; and the heaters *d d*, also, when divided into isolated or series of distinct teeth between each row of the larger teeth *b b*, may be made of a pyramidal form, if preferred, the characteristic feature—their lesser length in comparison with the teeth *b b*—being, of course, preserved. I apply the said breakers *d d* to both the rapidly and slowly moving cylinders, A and A′, but in some cases dispense with the helical ribs *c c*, as shown in the cylinder A.

I make the cylinders of cast-iron; and to enable others to construct them with facility, I will here describe the process I adopt for the purpose, viz: Supposing the said cylinders are required to have the helical ribs *c c* and continuous longitudinal breakers *b b*, as seen in A, Figs. 1 and 4. I provide a pattern having the said ribs and breakers attached thereto, and mold from it in the usual well-known manner. I then place in the mold which has been formed from the said pattern a shell of thin metal curved to fit the curve of the mold, and perforated with longitudinal rows of holes, arranged so that each hole shall come respectively opposite to the place where the tooth is to be formed. I then take a piercing-tool adapted for the purpose and pass it sufficiently far through each of the said holes in the metallic shell to form matrices in the sand, which will produce the required teeth in casting the cylinder. The shell is then removed, and the mold finished and closed in the usual well-known manner. That part of the piercing-tool which forms the matrices is of course made in the form of the tooth required, and should also be provided with a shoulder or stops to prevent inequality in the depth of the matrices.

Operation: The two cylinders A A′ rotating with different velocities, the teeth *b b* of each successive row of the more rapidly rotating cylinder A cut or tear out small lumps from the broken pieces of fruit which fall from above upon the said cylinders, and these lumps being caught or arrested by the slightly projecting breakers of the opposite cylinder, A′, are turned over by the teeth of the fast cylinder, as the teeth and breakers of both cylinders are successively presented to each other, and thus between them the said lumps are crushed or reduced to such a condition as to readily part with their juice under the action of the usual press, which is subsequently used for the purpose.

I do not wish to claim anything described in the patent of said Powel; but,

Having fully described the construction and operation of my improvement and pointed out its utility, what I claim as my invention, and desire to secure by Letters Patent, is—

The application of breakers *d d* along between the parallel rows of the teeth *b b* in each of the cylinders A A′; and this I claim whether the said breakers be formed as the plain or serrated continuous longitudinal ridges *d d* shown in the drawings, or as series of isolated or distinct small teeth between the said rows of the larger teeth *b b*, as described, and whether the helical ribs *c c* be used or not, the said teeth and breakers operating together substantially in the manner described, and for the purpose specified.

W. O. HICKOK.

Witnesses:
S. SCHRIVER.
W. KLINE.